UNITED STATES PATENT OFFICE.

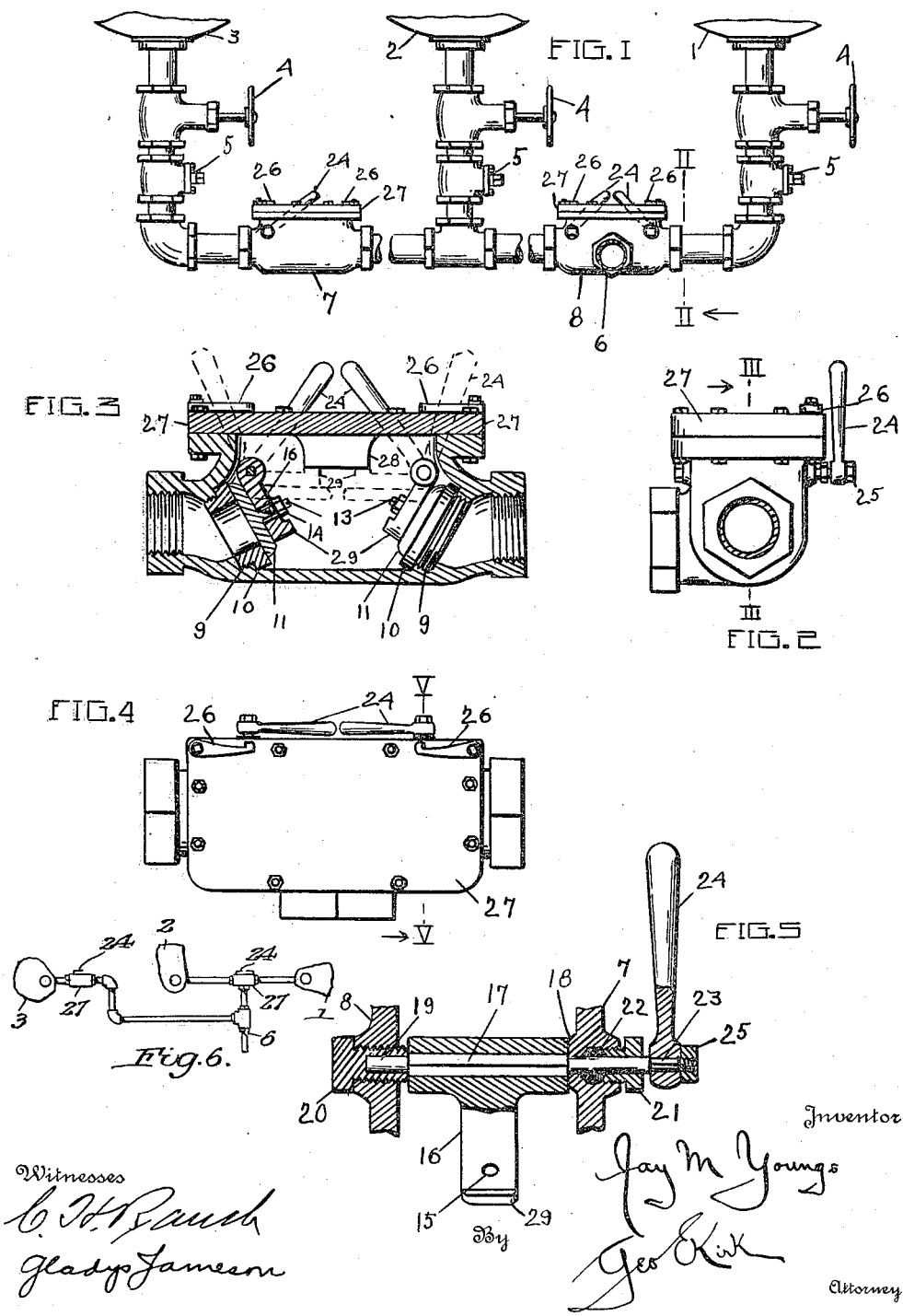

JAY M. YOUNGS, OF TOLEDO, OHIO.

SAFETY CHECK DEVICE.

1,193,958. Specification of Letters Patent. Patented Aug. 8, 1916.

Application filed November 9, 1914. Serial No. 870,953.

*To all whom it may concern:*

Be it known that I, JAY M. YOUNGS, a citizen of the United States of America, residing at Toledo, Lucas county, Ohio, have invented new and useful Safety Check Devices, of which the following is a specification.

This invention relates to fluid flow controllers for ducts and passages.

This invention has utility as a fitting and in boiler combinations as a blow off safety device.

Referring to the drawings: Figure 1 is a fragmentary side elevation of boiler blow off connections having the invention incorporated therewith; Fig. 2 is a section on the line II—II, Fig. 1, looking in the direction of the arrow; Fig. 3 is a section on the line III—III, Fig. 2, looking in the direction of the arrow; Fig. 4 is a plan view of the device of Figs. 2, 3; Fig. 5 is an enlarged fragmentary section on the line V—V, Fig. 4, and Fig. 6 is a diagrammatic showing in plan of the full safety protected embodiment of the device of Fig. 1.

The steam boilers 1, 2, 3, are each provided with the gate valve 4 and cut off valve 5 in their connections extending to the common waste 6, say extending to a sewer.

When a group of boilers in a common plant are in use, it is usual that at least one thereof may be off, or out of use, for cleaning or repair. In the normal handling of boilers, there is occasion more or less frequently, depending upon the operating conditions and the nature of the water supply, to blow off or clean out the lower part of the boiler by opening the valves 4, 5, and allowing the steam pressure in the boiler to force out toward the waste any mud, sediment or other accumulation, say of concentrated matter, near the boiler bottom. In taking a boiler off, or draining for cleaning or repair, the valves 4, 5, are opened. Should the valves 4, 5, of the boiler to be cleaned be left open after or during draining or cleaning, especially with workmen engaged therewith, danger of scalding arises from blowing off of any other boiler, in that the pressure is usually more readily relieved through such boiler out of use than through the waste.

To permit of drainage and ready care for a boiler which is off, as well as insure safety against the normal blow off operation of other boilers to the same waste, check devices are provided herein. The fitting 7 is a single inlet straight line fitting having but one automatic check valve therein, while the fitting 8 has in its straight line form opposing check valves for the pair of inlet openings, with the branch outlet opening or waste 6 extending therefrom.

As shown, the boilers are each protected from the other.

In the fittings are disposed the upwardly angling or diagonally disposed threaded portions 9 to receive the seats 10 upon which may rest the valve heads 11 having the integral stems 12 terminating in the notched heads 13 for receiving a screw driver, thereby permitting ready rotation of the valve head 11 upon the fitting seat 10 for producing a ground fit therebetween. The stem 12 is loosely held by the nut 14 and has slight clearance in the opening 15 through the arm 16 mounted upon the squared section 17 of the pivot bearing member having the extensions 18 and 19 as mounting bearings.

In assembling, this pivot bearing member may have its extension 18 enter one side of the fitting housing, pass through the arm 16 to bring its squared portion 17 to key the arm 16 thereto, the extension 18 passing through the other side of the fitting housing, while the extension 19 may be locked in proper bearing position by the plug 20. The bushing 21 may lock the packing 22 about the extension 18 to render tight the only joint through the fitting for steam tight operation. The extension 18 may have the squared portion 23 for keying thereon the handle 24 held in position by the nut 25.

In normal operation, the blowing off, or discharge from any boiler will open its check valve 11, but said valve is so disposed for gravity action as to resist boilerward flow from any other boiler. Safety to workmen in a boiler out of use is accordingly assured.

At times in working down scale, clogging occurs near the blow off connections and it is desirable to blow back thereagainst. This may effectively occur even with the waste 6 left open. To provide this additional utility, the valve 11 may be manually operated through the medium of the handle 24. As the valves are disposed in opposing or alined relation, the blow off or automatic operation from the boiler in use may shoot right across through the fitting to lift out of position any scale clog in the off boiler. To hold the valve 11 open for this operation a hook 26 may engage the handle 24.

To introduce the valve elements 10, 11, in position in the fitting housing, as well as the arm 16, the housing is provided with the removable top plate 27. The angular or diagonal disposal of the valve elements 10, 11, is such that a grinding tool may be inserted from the housing opening closed by the plate 27, as well as the thread cutting tool for providing the thread anchor for the element 10. Notwithstanding the slight diagonal position of these check valves, the fitting has a straight line for fluid flow therethrough. Under normal circumstances with the check valves in operation in the branch fitting, the waste may be at the convenient angle or direction from the inlet passages.

When the check valves are swung open, in order not to batter the heads 13, the plate 27 is provided with the lug 28 against which may strike the projections 29 formed on the free ends of the arms 16.

What is claimed and it is desired to secure by Letters Patent is:

1. The combination with a plurality of boilers of a common waste therebelow, and connections between said boilers and waste including a check valve device between each boiler and said waste, said waste having an outlet below the check valves for draining therefrom.

2. The combination with a plurality of boilers of a common waste therebelow, and connections between each boiler and said waste including a check valve automatically operable against normal flow from either boiler into the other boiler, said waste being below the check valves for draining therefrom.

3. The combination with a plurality of boilers, a main waste duct, a branch waste duct from the main waste to each boiler, and a check valve in the branch waste normally opened by blow off from the boiler to which the branch extends and disposed to be closed by blow off or pressure from the main waste or some other boiler, thereby providing automatic safety means when one boiler is off against pressure from another boiler, there being a housing member for said valve having an opening extending from adjacent the valve to intercept the extension of the axis of the valve opening, a cap for the opening whereby removal of the cap and valve provides clearance for seat grinding tool operation through said opening.

4. A plural valve fitting embodying an automatic check valve, manual operable means connected thereto for positioning said valve for blowing therethrough, and holding means for the valve in blow off position, there being an outlet for said fitting on the side toward which the valve opens, said outlet being below said valve.

5. A branch fitting embodying a plurality of inlet openings, and an outlet opening, two of said inlet openings being opposed, a check valve for each inlet opening and disposed above said outlet opening, and an arm for one of said valves to permit opening thereof so that the other may act to blow therethrough.

6. A blow off fitting embodying a housing member having a pair of alined openings, one of said openings being provided with a seat inclined as to the alinement of the openings, a check valve pivotally mounted to swing into closing position on said seat, said fitting having an opening therefrom on the side toward which the valve opens and disposed below said valve for draining said fitting, a cap member for the housing laterally of the alinement of the openings, and means for detachably mounting the cap member in position to permit access to the valve.

In witness whereof I affix my signature in the presence of two witnesses.

JAY M. YOUNGS.

Witnesses:
   GEO. E. KIRK,
   GLADYS JAMESON.

Copies of this patent may be obtained for five cents each, by addressing the "Commissioner of Patents, Washington, D. C."